United States Patent [19]
Lewis

[11] 3,769,791
[45] Nov. 6, 1973

[54] FUEL SUPPLY SYSTEMS FOR GAS TURBINE ENGINES

[75] Inventor: Geoffrey Arthur Lewis, Solihull, Warwickshire, England

[73] Assignee: Joseph Lucas (Industries) Limited, Birmingham, England

[22] Filed: Nov. 5, 1971

[21] Appl. No.: 195,970

[30] Foreign Application Priority Data
Nov. 7, 1970 Great Britain .................. 53,091/70

[52] U.S. Cl. ........................... 60/39.28 R, 137/117
[51] Int. Cl. .............................................. F02c 9/10
[58] Field of Search ..................... 60/39.28; 137/117

[56] References Cited
UNITED STATES PATENTS

| | | | |
|---|---|---|---|
| 3,078,670 | 2/1963 | Werner | 60/39.28 R |
| 3,381,470 | 5/1968 | Hammerstein | 60/39.28 R |
| 3,498,058 | 3/1970 | Greune | 60/39.28 |
| 3,616,647 | 11/1971 | Johnson | 60/39.28 |

*Primary Examiner*—Clarence R. Gordon
*Attorney*—Holman & Stern

[57] ABSTRACT

A fuel supply system for a gas turbine engine has a positive-displacement pump driven by the engine a valve downstream of the pump having an inlet and two outlets. A control element varies flow through the two outlets simultaneously. One of the outlets supplies fuel to the engine and the other outlet communicates with a pressure-responsive spill valve with the low pressure side of the pump. The spill valve arrangement is such that the pressures at the valve outlets remain substantially equal.

16 Claims, 3 Drawing Figures

Patented Nov. 6, 1973

3,769,791

2 Sheets-Sheet 1

FUEL SUPPLY SYSTEMS FOR GAS TURBINE ENGINES

This invention relates to fuel supply systems for gas turbine engines and has as an object to provide such a system in a convenient form.

A fuel supply system in accordance with the invention comprises a fixed displacement fuel pump driven in use, at a speed proportional to the engine speed; a valve including a chamber having an inlet connected to the outlet of the pump and first and second outlets and a control element variably positionable between said outlets so as to vary the effective flow area of the two outlets simultaneously; a pressure control unit sensitive to the pressures at said two outlets and arranged to spill sufficient fuel from the first outlet to maintain the ratio of said pressures substantially constant; and means for positioning the control element of the valve in accordance with the fuel requirement of the engine.

Figure 1:
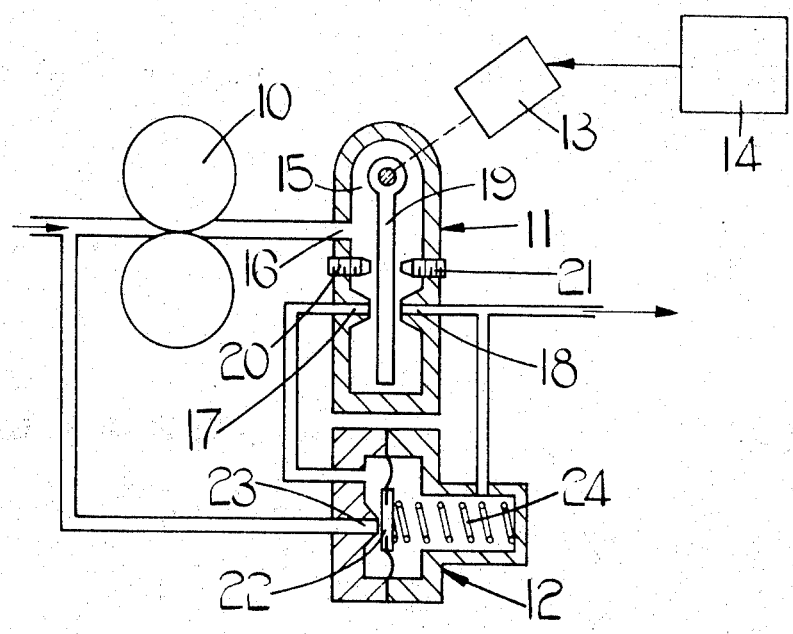
Figure 2:
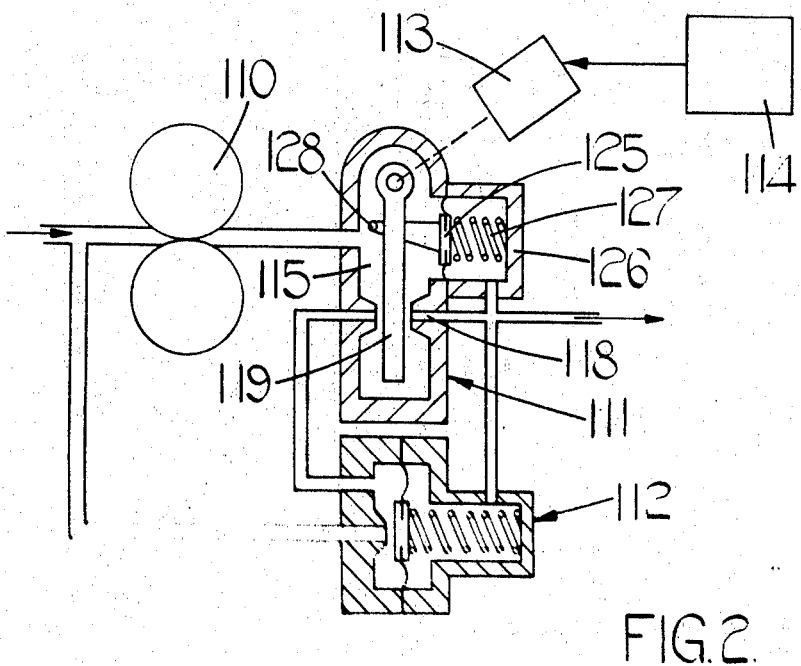
Figure 3:
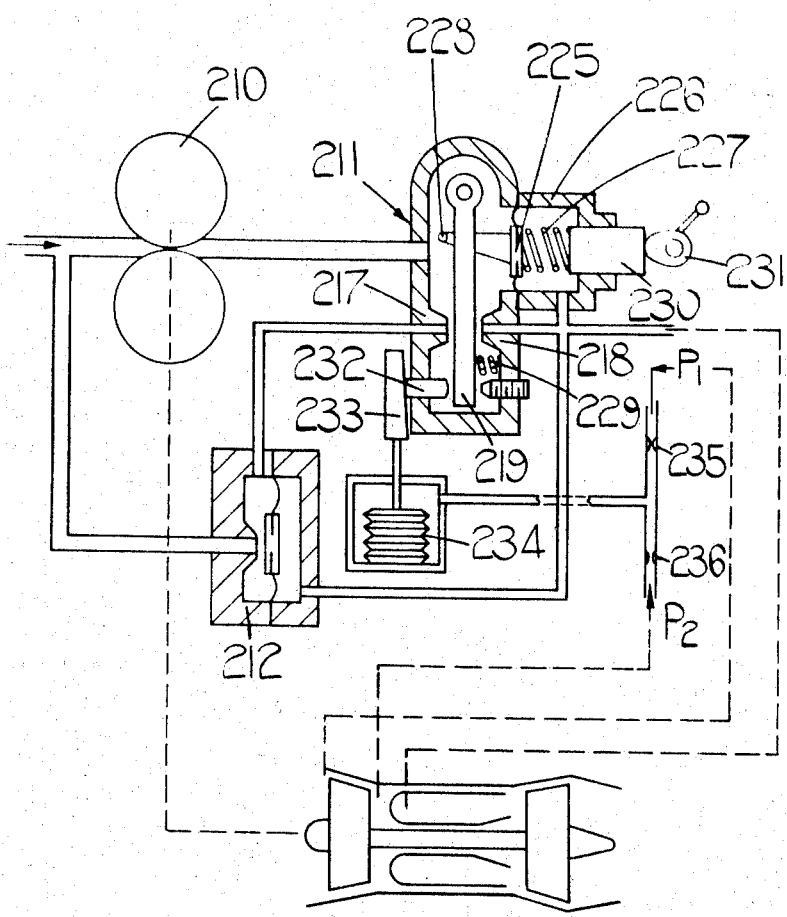

In the accompanying drawings, FIGS. 1 to 3 are diagrammatic views of three examples of the invention, the example of FIG. 3 also showing the connections to an associated gas turbine engine.

FIG. 1 is mechanically the simplest form of the invention and the system shown comprises a fixed displacement pump 10 which is driven at a speed proportional to the engine speed, a valve 11, and a pressure control unit 12 and an electrical actuator 13 with a control circuit 14 for the valve.

The valve 11 includes a chamber 15 with an inlet 16 into which the full flow from the pump 10 passes. The chamber has first and second outlets 17, 18 respectively and a control element 19 in the form of an arm pivotable at one end and extending between the outlets 17, 18 adjacent the opposite end. The actuator 13 positions the element 19 so that the effective area of both outlets can be varied simultaneously. Movement of the element 19 reduces the effective area of one outlet and increases the effective area of the other. A pair of adjustable stops 20, 21 are provided for limiting movement of the element 19 towards the outlets 17, 18 respectively.

The pressure control unit is in the form of a chamber divided into two by a diaphragm unit 22. There are connections from the outlets 17, 18 to this chamber on opposite sides of the diaphragm unit. On the side of the diaphragm unit to which the outlet 17 is connected there is an outlet 23 which is controlled by the diaphragm unit and this outlet 23 is connected to the low pressure side of the pump 10. A light spring 24 is provided on the other side of the diaphragm unit to urge the latter towards the outlet 23.

The pressure control unit is such that, over the greater part of the range of pressures in question the diaphragm unit is so positioned that the pressures on both sides thereof are substantially equal, thereby maintaining the ratio of such pressure substantially constant at unity.

At the lower end of the pressure range the effect of the spring 24 becomes significant and the pressure at outlet 18 becomes higher than that at outlet 17.

Outlet 18 is connected to the burner manifolds of the engine with the result that, for any given position of the control element 19, the rate at which fuel flows to the engine is directly proportional to the engine speed, except at the lower end of the engine speed range. Whereas in the example described, the pressures at outlets 17 and 18 are maintained equal, the pressures on the control element 19 are balanced and this simplifies the actuator considerably by eliminating the need for a closed loop servo-mechanism.

In the modification shown in FIG. 2 a top speed governor has been incorporated in the valve 111 which is otherwise identical to the valve 11. This enables the top-speed governing function of the control circuit 114 to be omitted. The governor relies on the fact that the pressure loss through the outlet 118 is proportional to the square of the engine speed for any given position of the control element 119. A diaphragm unit 125 is mounted in an opening in the wall of the chamber 115. A cover 126 over the diaphragm unit 125 has its interior connected to the outlet 118. A spring 127 urges the diaphragm unit in the same direction as the pressure in the cover 126.

An abutment 128 carried by the diaphragm unit 125 is engageable with the control element 119 to move the latter towards the outlet 118 when the pressure drop is excessive.

The embodiment shown in FIG. 3 is a complete combined accleration and speed control. In this case the control element 219 of the valve 211 is spring loaded towards the outlet 217 by a spring 229. An adjustable stop 230 is provided for the spring 227 of the governor and this stop is movable by a manual speed control lever 231. In this case the unit 212 which replaces the unit 12 is springless so that true proportional flow characteristics are obtained. The speed limit set by the governor mechanism varies in dependence on the setting of lever 231. In steady running conditions the moment of the force applied to the control element 219 by the abutment 228 is exactly counter-balanced by the moment of the force applied by spring 229.

For acceleration control, there is a variable stop 232 to coact with the control element 219. This stop 232 is positionable in accordance with air pressure conditions arising in the engine compressor and is engaged with a wedge-shaped cam 233 movable by a resilient bellows unit 234 to which an air pressure signal derived from the compressor is applied to displace the cam 233. The air pressure applied to the bellows unit 234 is obtained by connecting an air-potentiometer consisting of two flow restrictor 235, 236 between pressure tappings in the engine air intake ($P_1$) and high pressure side of the compressor ($P_2$).

The bellows unit 234 is connected to the potentiometer between the two flow restrictors.

During rapid acceleration the control element 219 abuts the stop 232 and is thus positioned in accordance with the compressor pressure conditions to avoid stalling of the compressor.

The spring 24 in the unit 12 can be omitted to give substantially true proportional flow characteristics, although the fact that the pressure at outlet 17 does not act over the whole of the left hand side of the diaphragm 22, owing to the outlet 23, may then become of significance. The inclusion of a light spring 24 can thus be of considerable significance in the determination of the flow characteristics of the system and these characteristics can be varied by choice of the properties of the spring.

I claim:

1. A fuel supply system for a gas turbine engine, comprising a fixed displacement pump driven in use, at a speed proportional to the engine speed; a valve including a chamer having an inlet connected to the outlet of the pump and first and second outlets and a control element variably positionable between said outlets so as to vary the effective flow area of the two outlets simultaneously; a pressure control unit sensitive to the pressures at said two outlets and arranged to spill sufficient fuel from the first outlet to maintain the ratio of said pressures substantially constant; and means for positioning the control element of the valve in accordance with the fuel requirement of the engine.

2. A system as claimed in claim 1 in which the means for positioning the control element comprises an electrical actuator.

3. A system as claimed in claim 1 in which the said second outlet is connected to the burners of the engine.

4. A system as claimed in claim 1 in which the control element comprises an arm pivotally mounted in said chamber.

5. A system as claimed in claim 1 in which movement of the control element causes the flow area of one of the outlets to be increased and the flow area of the other outlet to be decreased.

6. A system as claimed in claim 1 in which the pressure control unit comprises a diaphram unit subjected on opposite sides to the pressures at the respective outlet and a port communicating with a low pressure side of the pump, said diaphragm unit acting to control flow from said first outlet to said port.

7. A system as claimed in claim 6 which includes a means biasing the diaphragm unit in a direction to shut said port.

8. A system as claimed in claim 1 in which the ratio of said pressures is maintained substantially at unity.

9. A system as claimed in claim 3 which includes means for limiting movement of said control element in response to said positioning means.

10. A system as claimed in claim 9 in which said movement limiting means comprises a device responsive to an increase in the pressure drop across said second outlet to limit movement of said control element in a direction to increase flow through said second outlet.

11. A system as claimed in claim 10 in which said device comprises a diaphragm subjected on its respective sides to the pressures upstream and downstream of said second outlet, and an abutment member movable by said diaphragm and engageable with said control member.

12. A system as claimed in claim 9 in which said movement limiting means comprises a stop engageable by said control member and movable in response to a difference in the pressures across a compressor of the engine.

13. A system as claimed in claim 12 in which said stop is operable to limit flow through said second outlet.

14. A system as claimed in claim 9 which includes a device responsive to an increase in the pressure drop across said second outlet to limit movement of said control element in a direction to increase flow through said second outlet.

15. A system as claimed in claim 14 in which the said device comprises a diaphragm subjected on its respective sides to the pressures upstream and downstream of said second outlet, and an abutment member movable by said diaphragm and engageable with said control member.

16. A system as claimed in claim 15 in which the means for positioning said control element comprises first biasing means urging said control element towards said abutment member, second biasing means urging said diaphragm in a direction to permit an increased flow through said second outlet and means for varying the force applied by said second biasing means.

* * * * *